US006926758B2

(12) United States Patent
Truce

(10) Patent No.: US 6,926,758 B2
(45) Date of Patent: Aug. 9, 2005

(54) ELECTROSTATIC FILTER

(75) Inventor: Rodney John Truce, Brisbane (AU)

(73) Assignee: Indigo Technologies Group Pty Ltd, Spring Hill (AU)

( * ) Notice: Subject to any disclaimer, the term of this patent is extended or adjusted under 35 U.S.C. 154(b) by 86 days.

(21) Appl. No.: 10/416,879

(22) PCT Filed: Nov. 20, 2001

(86) PCT No.: PCT/AU01/01501

§ 371 (c)(1),
(2), (4) Date: May 15, 2003

(87) PCT Pub. No.: WO02/42003

PCT Pub. Date: May 30, 2002

(65) Prior Publication Data

US 2004/0025497 A1 Feb. 12, 2004

(30) Foreign Application Priority Data

Nov. 21, 2000 (AU) ............................................. PR1605

(51) Int. Cl.[7] .................................................. B03C 3/36
(52) U.S. Cl. ...................... 95/78; 95/79; 96/62; 96/77; 96/97
(58) Field of Search ............................... 96/61, 77, 96, 96/97, 53, 62; 95/78–79, 71

(56) References Cited

U.S. PATENT DOCUMENTS

| | | | | |
|---|---|---|---|---|
| 2,081,772 A | * | 5/1937 | Saint-Jacques ................. | 95/63 |
| 3,184,901 A | * | 5/1965 | Main .............................. | 96/16 |
| 3,258,897 A | * | 7/1966 | Mayer et al. ................... | 96/76 |
| 4,094,653 A | * | 6/1978 | Masuda ........................... | 96/77 |
| 4,146,371 A | * | 3/1979 | Melcher et al. ................. | 95/62 |
| 4,352,681 A | | 10/1982 | Dietz .............................. | 96/61 |
| 4,478,613 A | | 10/1984 | Brettschneider et al. ....... | 96/61 |
| 4,481,017 A | * | 11/1984 | Furlong .......................... | 95/74 |
| 4,853,010 A | | 8/1989 | Spence et al. .................. | 96/52 |
| 4,876,852 A | | 10/1989 | Abthoff et al. ............... | 60/275 |
| 4,976,752 A | * | 12/1990 | Torok et al. .................... | 96/43 |
| 5,041,145 A | * | 8/1991 | Kakinuma et al. ............. | 96/52 |
| 5,547,493 A | * | 8/1996 | Krigmont ....................... | 96/54 |
| 5,547,496 A | * | 8/1996 | Hara .............................. | 96/79 |
| 5,591,253 A | | 1/1997 | Altman et al. .................. | 96/61 |
| 5,968,231 A | * | 10/1999 | Parmentier et al. ............ | 95/28 |
| 5,972,215 A | * | 10/1999 | Kammel ..................... | 210/243 |
| 6,017,381 A | | 1/2000 | Dunn et al. ..................... | 95/3 |

FOREIGN PATENT DOCUMENTS

| | | | | |
|---|---|---|---|---|
| DE | 3711312 A | 10/1988 | | |
| GB | 2346821 A | 8/2000 | | |
| JP | 5-161859 | * | 6/1993 | .................... 96/97 |
| SU | 980842 A | 12/1982 | | |

* cited by examiner

Primary Examiner—Richard L. Chiesa
(74) Attorney, Agent, or Firm—The Webb Law Firm

(57) ABSTRACT

An electrostatic filter (1) has a chamber (11) into which a gas stream is introduced. An ioniser (19) in the form of an electrode array (20) is located in the chamber (11) and creates an ionising zone through which the gas stream passes. A charged outlet (21) is located downstream from the ioniser (19). As the gas stream passes through the ionising zone, the unwanted particles therein are charged and urged away from the outlet (21) by the ioniser (19). Charged particles approaching the outlet (21) are also electrostatically repelled therefrom, permitting "clean" gas to be extracted through the outlet.

10 Claims, 4 Drawing Sheets

ELECTROSTATIC FILTER

This application is the United States national phase of International Application No. PCT/AU01/01501, filed on Nov. 20, 2001, which claimed priority to Australian Application No. PR 1605, filed on Nov. 21, 2000.

THIS INVENTION relates to an electrostatic filter suitable for separating (solid or liquid) particles from a gas stream. The invention is particularly suitable for controlling air pollution from industrial processes, but is not limited to that particular application.

For example, the invention may also be used to filter particles from air supplied to air conditioning or ventilation systems, and to remove dust particles from airstreams in vacuum cleaning devices. The invention may also be used generally for separation of particles (solid or liquid) from a gas stream as a precursor to further processing of the gas stream, e.g. in recovery of fly ash and other fines in cement works.

BACKGROUND ART

Stringent controls are imposed by regulatory authorities on the emission of hazardous air pollutants, and these are likely to become even more stringent as pollution levels increase. Of particular concern are toxic trace metals and their compounds which exist in the form of small particles. Due to the nature of particulate formation in combustion processes, many of the trace metals, such as arsenic, cadmium, nickel and high-boiling point organic hazardous air pollutants, tend to concentrate on the fine, sub-micron sized particles present in flue gas.

There are various known types of devices which have been used to clean polluted airstreams by separating contaminant particles from the airstream. The known device types include "scrubbers", cyclonic separators and electrostatic filters. Examples of such devices can be found in U.S. Pat. Nos. 4,352,681; 4,478,613; 4,853,010; 5,591,253 and 6,017,381. Some installations may utilise two or more of such device types.

Although the known devices are generally suitable for removing larger particles from airstreams, they are usually much less effective in filtering out smaller particles, particularly sub-micron particles. However, it is the smaller particles which are the most problematic pollutants. Such small particles can be hazardous to health as they are easily absorbed through the lungs.

The smaller micron and sub-micron particles also have a greater visual effect in polluted atmospheres. For the same total mass, smaller particles will generally be dispersed over a greater volume than larger particles, thereby increasing the volume of the polluted area. Further, the smaller particles cause "bending" or defraction of light, making the polluted air more visible.

Known pollution control devices tend to be rather large devices adapted for use in large factories and combustion plants. This limits their use to large scale installations. Although some smaller-sized electrostatic/cyclonic filters are known, the smaller-sized filters tend to be less efficient.

In electrostatic filters, dust particles in a gas stream are charged by corona discharge or other ionic treatment, and the charged particles are electrostatically repelled from an aperture through which the "clean" air is removed. It is believed that one of the factors contributing to the relative inefficiency of known electrostatic filters is the short "treatment" time of the particles in the ionising stage. For example, in the electrostatic filter illustrated in FIG. 3 of U.S. Pat. No. 4,352,681, the corona-producing portion 11 is a relatively short axial section which is traversed in a short period by the particles in the airstream. Consequently the particles, particularly the smaller particles, do not have sufficient time to be charged properly, and the electrostatic repulsion at the air take-off is less effective for such particles.

Another factor believed to contribute to the relative inefficiency of electrostatic filters, particularly for sub-micron particles, is the proximity of the take-off apertures to the ionisation zone, as in the embodiment of FIG. 3 of U.S. Pat. No. 4,478,613. It is believed that such proximity does not allow the smaller particles (having less charge) sufficient travel time to be moved far enough away from the take off apertures to avoid being extracted with the "cleaned" air.

It is an object of the present invention to provide an improved electrostatic filter.

SUMMARY OF THE INVENTION

In one broad form, the invention provides apparatus for separating particles from a gas stream, the apparatus comprising a housing having a chamber therein, and an inlet for introducing the gas stream into the chamber, an ioniser in the housing for creating an ionising zone within the chamber through which the gas stream passes in use, particles in the gas stream being charged as they pass through the ionising zone, and a structure in the housing defining an outlet for extracting gas from the chamber, the outlet being defined by one or more apertures in the structure which is operatively charged to the same polarity as the charged particles, characterised in that the outlet is located downstream from the ionising zone, and in that the particles are moved away from the outlet as they pass through the ionising zone.

The ioniser is typically an electrode array comprising multiple rows of electrodes distributed in the direction of travel of the gas stream. The electrodes are connected to a high voltage power supply, and generate a flow of ions to an earthed surface. This ionic "wind" carries or urges the particles in the gas stream to or towards the earthed surface, and away from the outlet(s).

Preferably, the particles in the gas stream spend at least 0.2 seconds in the ionising zone, and typically 0.2 second to 2.0 seconds.

Each outlet has an electric field operatively associated with it to repel charged particles from the outlet. Typically, the structure defining the outlet(s) is connected to the same high voltage source as the electrode array of the ioniser. The outlet apertures are preferably located at least as far from the earthed surface as the electrode array.

A dust collection hopper or container is suitably located beneath the earthed surface to collect dust and other particles removed from the gas stream which is extracted from the outlet(s).

The gas streams may be fed to, and extracted from, the housing via plenum-like spaces. Preferably, the outlets are orientated so that the particles must change direction in order to pass through the outlets.

The apparatus may comprise a series of ionisers spaced in the direction of flow of the gas stream, each ioniser being followed by one or more outlets. In this manner, the gas stream is progressively "cleaned".

In another form, the invention provides a method of separating particles from a gas stream, including the steps of:

passing the gas stream through an ionising zone in which the particles are charged by a flow of ions from an ioniser for at least a minimum predetermined period, then passing the gas stream past at least one outlet which is operatively charged to the same polarity as the charged particles, and extracting gas from the gas stream through the outlet, characterised in that the outlet is located downstream and separate from the ionising zone and in that the particles are moved away from the outlet as they pass through the ionising zone.

The ionic "wind" created by the ioniser urges the particles away from the outlet(s). An electric field associated with the outlet repels the charged particles, so that "clean" gas is extracted through the outlet.

In order that the invention may be more fully understood and put into practice, preferred embodiments thereof will now be described with reference to the accompanying drawings.

DESCRIPTION OF PREFERRED EMBODIMENTS

Figure 1:
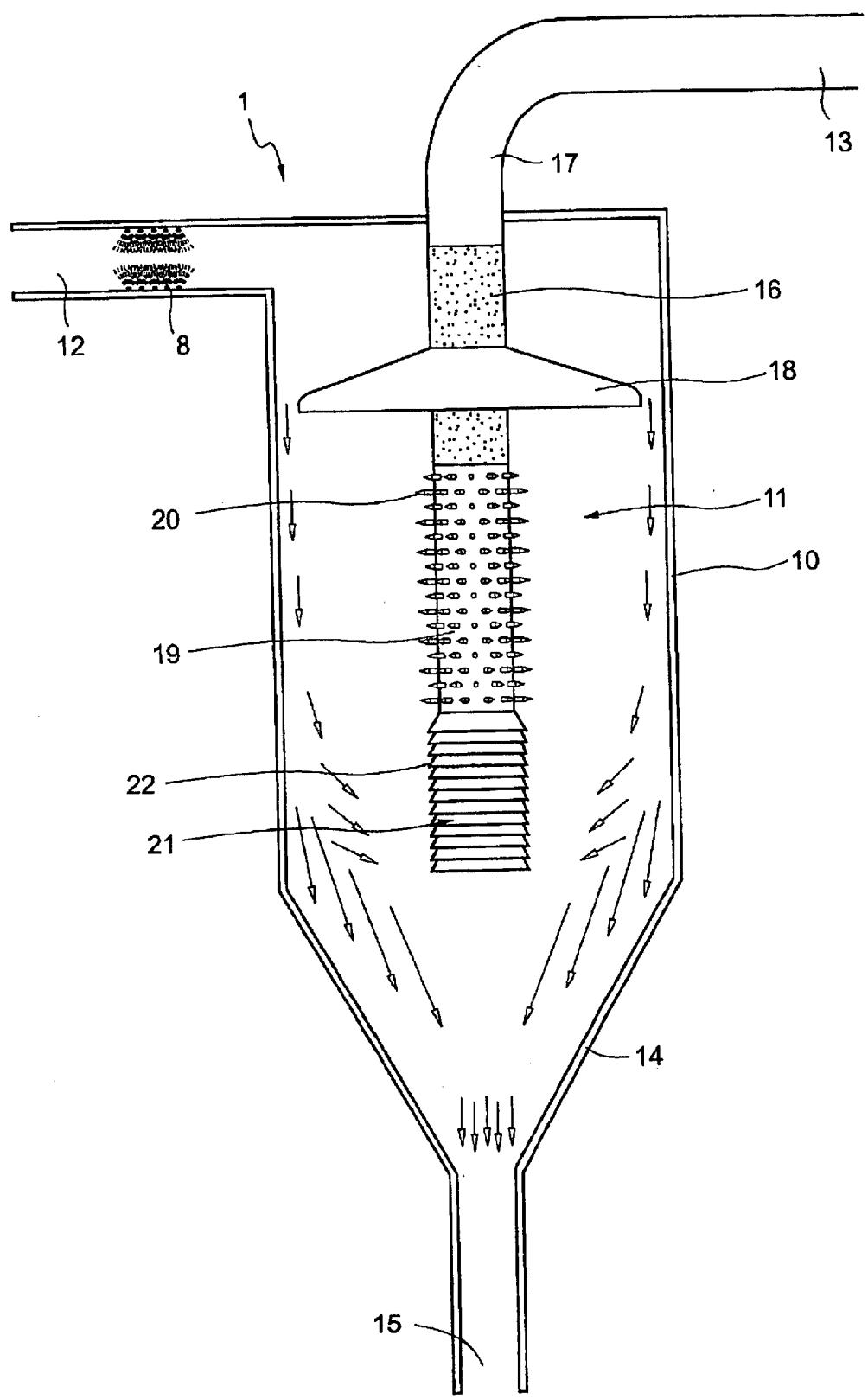
FIG. 1 is a vertical sectional schematic view of an electrostatic filter according to one embodiment of the invention.

The electrostatic filter of FIG. 1 comprises a housing 1 having a cylindrical wall 10 defining a chamber 11. At least the inside surface of the wall 10 is a conductive earthed surface. The housing has an inlet 12 adapted to receive "dirty" gas containing dust particles and other pollutants. The bottom of housing 10 is tapered to form a collection hopper 14 which receives dust particles and other pollutants removed from the inlet gas as described below. The hopper 14 communicates with an outlet 15 for discharging the collected dust particles as well as water which may be used to wash down the wall 10. The filter also has an outlet 13 for "clean" gas from which the dust particles and pollutants have been removed.

The wall 10 is typically circular in cross section, and the inlet 12 may be located tangentially to the housing so that the inlet gas enters the chamber 11 in a swirling action. Water sprays 8 may be used at the inlet to enhance dust removal and cool the incoming gas.

The "dirty" gas at the inlet is typically flue gas from combustion or other industrial processes. The inlet gas may alternatively be vehicle exhaust gas, a vacuum cleaner airstream to be cleaned, or atmospheric air for filtering prior to use in air conditioning or other ventilation systems. The inlet gas typically contains particles of dust and other pollutants which may be as small as 0.1 micrometre ($\mu$m) in diameter. Fine particles, less than 5 $\mu$m in diameter, have been extremely difficult to remove from gas streams, and are a major health hazard due to their high potential toxicity and ease of respiration. The dirty inlet gas may contain dust burdens as high as 1000 gms/m$^3$, although levels of 10 gms/m$^3$ are most common.

An electrically insulating tube 16 is mounted centrally and axially within the chamber 11 as shown in the drawing. The insulating tube 16 may suitably be constructed from plastic or epoxy material for low temperature applications, or from ceramic material for high temperature applications. The upper end of the tube 16 communicates with a conduit 17 which provides the outlet 13 for the clean gas.

A gas flow distributor 18 is suitably mounted on the tube 16. The distributor 18 is a baffle-like radial plate with a part-conical upper surface. The distributor 18 is dimensionally smaller than the cylindrical wall 10 so that an annular gap or clearance is provided between the distributor 18 and the wall 10. A plenum-type chamber is formed above the distributor 18, from which the dirty inlet gas is distributed evenly around the outside of the chamber 11, relying on a small pressure drop across the annular gap or clearance to distribute the gas flow around the outside of an electrostatic chamber formed below the distributor (as illustrated by the arrows). The gas distribution may be assisted by the cyclone effect generated by the tangential mounting of the inlet 12 to the cylindrical housing 1, although a cyclonic action is not necessarily required, particularly for small particle separation. This cyclone effect will urge the heavier dust particles towards the outer cylindrical wall 10 of the housing 1.

An ion generator 19 is mounted on the central axial tube 16 in the electrostatic chamber, below the distributor 18. Due to the insulative properties of the tube 16, the ion generator 19 is electrically insulated from the outlet conduit 17 and the other components of the housing. The ion generator 19 is a hollow metal tube having radial electrodes 20 on its outside which have sharp points at their distal ends. Each electrode 20 may be in the form of a prong or barb formed from a single strand wire or multiple strands of wire of small diameter. The electrodes 20 are arranged in axially spaced rows distributed over the ioniser 19.

The distance between the electrodes 20 of the ion generator 19 and the outer cylindrical wall of housing 10 is typically 100 mm to 1000 mm, depending on the application for which the electrostatic filter is designed.

In use, the ion generator 19 is connected to a high voltage source. The voltage must be high enough to create corona at the electrode ends. The voltage is usually a minimum of 1 kV, and more typically 20 kV to 50 kV. (For clarity, the voltage source and the wire(s) connecting the ion generator to the voltage source are omitted from the drawing).

The high voltage at the sharp points of the electrodes 20 creates a strong electric field around each sharp point which, in turn, produces intense corona at those points. The intense corona generated at the sharp point of each of the electrodes 20 produces a concentrated flow of ions from the ion generator 19 to the wall 10 of the housing 1 which is earthed. The use of such electric fields around sharp extremities to create corona discharge and ion flow is known in the art and need not be described in detail in this application.

The ion generator 19 therefore produces an ionising zone in which an ionic or electrostatic "wind" flows from the ion generator 19 to the earthed cylindrical wall 10, generally perpendicular to the flow of gas from the distributor 18. This ionic wind carries or urges the dust particles in the dirty gas to the internal surface of the cylindrical housing wall 10. The ions in the electrostatic "wind" transfer their charge to dust particles which they encounter in the gas stream, causing the dust particles to be charged to the same polarity as the electrodes 20 of the ion generator 19. The charge applied to the particles will cause the particles to be repelled from the high voltage electrode array 20 and to be attracted to the earthed wall 10 of the housing. The particles are therefore moved to the wall by a combination of kinetic and electrical forces.

The axial length of the ion generator 19 is selected so that the time taken for the gas to pass by the ion generator ("the treatment time") is sufficient to allow the dust particles to be moved out to the cylindrical wall by the ionic "wind". Under intense ion bombardment, the dust particles will charge very rapidly and achieve saturation charge in a fraction of a second. However, the treatment time should be long enough to allow even the smaller particles to be charged and moved out to the wall 10. Preferably, the treatment time, i.e. the time for which the gas is subject to the ionic "wind" from the electrode array, is at least 0.2 sec, and more preferably between 0.2 sec and 2 sec. Depending on the gas speed, this may typically require the electrode array of the ion generator 19 to be 0.2 m to 2 m long (in the axial direction), containing 5 to 50 axially-spaced rows of electrodes 20.

The ion generator may be constructed to permit its length to be adjusted manually or automatically to optimise the period of time which the particles spend in the ionising zone, e.g. by using a telescoping construction for the ion generator.

Dust particles in the air which attach to the wall 10 are scoured off and carried to the dust collection hopper 14 by the gas flow and gravity. In the case of highly resistive dust which is difficult to detach from the wall surface, it may be necessary to wash the wall 10 with water using overhead water sprays.

A gas outlet or take-off 21 is located below the ion generator 19. The gas take-off 21 is preferably located as far from the earthed wall 10 as the electrode array 20. The gas take-off 21 comprises a plurality of stacked vanes 22 which define annular spaces between them (hereafter referred to as the "vane apertures"). The vane apertures communicate with the outlet conduit 17 via the hollow interior of the ion generator 19 and the insulating tube 16.

The vanes 22 are metal vanes which are electrically connected to the ion generator 19 so that they are also maintained at the same high voltage as the ion generator. The high voltage applied to the vanes 22 creates intense electrical fields around the outer circular edges of the vanes. These electric fields extend across the vane apertures and will repel charged particles due to the large electrostatic forces developed by this configuration. Hence, the electrostatic fields at the vane apertures will prevent the dust particles which have been charged by passage through the ionic "wind" from entering the vane apertures.

Moreover, as can be seen in the drawing, in order to enter the vane apertures, the particles are required to change their direction of movement in order to pass out of the vane apertures. In addition to the electrostatic repulsion described above, the inertia of the particles in the downward direction, coupled with gravity, also helps prevent the dust particles exiting through the vane apertures with the "clean" gas.

The dust particles which are repelled from the vane apertures fall into the dust collection hopper 14 at the bottom of the housing as a result of gravity and the overall downward gas flow. The collected dust is removed from the hopper 14 through the dust outlet extraction pipe 15. This may suitably be achieved using a venturi water suction system or through dry dust extraction using a dust slide or pneumatic conveying system. Alternatively, the hopper 14 may be removable.

The "clean" gas extracted through the vane apertures 22 passes through a plenum-like space formed by the hollow tubular interior of the ion generator 19, the insulated tube 16 and the outlet conduit 17, before exiting from the clean gas outlet 13.

In use, "dirty" gas is introduced into inlet 12. Due to the operation of the gas flow distributor 18 and the cyclone effect on the swirling inlet flow, larger particles of dust and other contaminants in the inlet gas are moved towards the outside cylindrical wall 10 of the housing. As the gas flows axially down the chamber 11 past the ion generator 19, the ionic "wind" charges the particles in the gas stream, causing them to be repelled away from the ion generator 19 and attracted to the earthed outer wall 10. Clean gas (typically air) is extracted via the vane apertures. Charged particles in the gas are repelled from the vane apertures by electrostatic forces arising from intense electric fields created across the apertures by high voltage applied to the edges of the vanes defining the apertures. The momentum of the particles in a direction opposite or angled to the air take-off direction, as well as gravity, are additional forces acting against the particles being extracted through the vane apertures. Consequently, the gas extracted via the vane apertures is "clean" gas from which the dust particles and other contaminants have largely been removed.

The dust particles and other contaminants are collected in the hopper 14 by using the gas flow along the cylindrical wall 10 to scour the particles from the wall, using water sprays to wash down the wall 10, and/or utilising gravity and particle momentum in the low flow region below the vane take-off.

Although the tangential positioning of the inlet 12 promotes a cyclonic effect, such an effect is not required and the flow of gas through the chamber may be predominantly linear or axial as shown in other embodiments herein.

Figure 2:
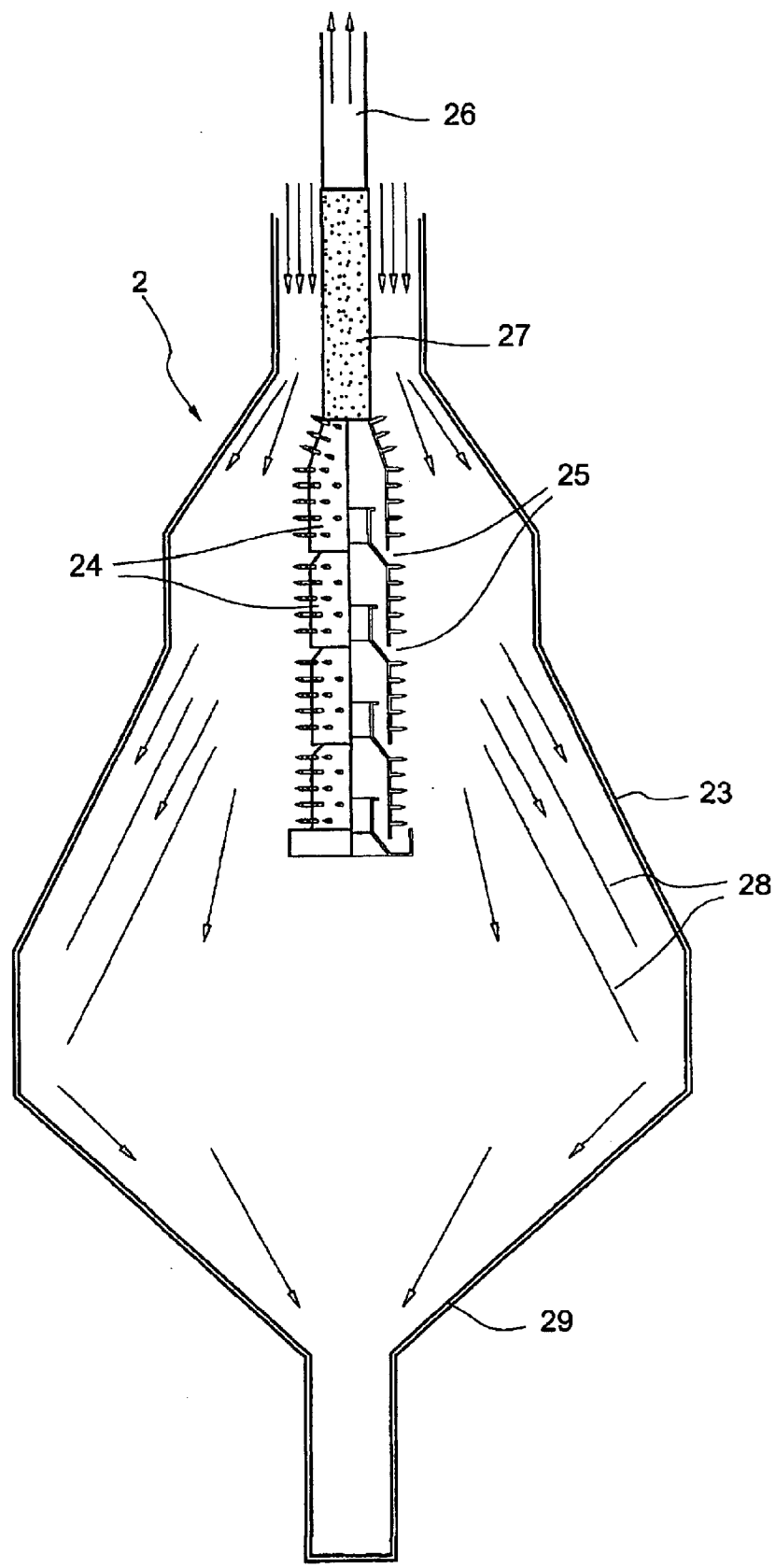
FIG. 2 is a vertical sectional schematic view of an electrostatic filter according to a second embodiment of the invention.

With large gas flows, multiple electrode arrays may be used, with take-off apertures located between them, as illustrated in the embodiment of FIG. 2. The electrostatic filter of the embodiment of FIG. 2 has a housing 2 formed by a wall 23 of generally circular cross section and whose diameter increased progressively in the direction of gas flow (indicated by the arrows). Multiple tubular electrode assemblies 24 are located centrally within the chamber formed by the wall 23. Gas outlets or take-offs 25 are provided between each electrode array 24. Each gas take-off 25 is in the form of one or more apertures in the bottom of each electrode array. These apertures communicate with the hollow interior of the electrode arrays 24 which, in turn, communicate with an outlet 26 via an insulating tube 27 to which the electrode arrays 24 are mounted.

The inlet gas flowing in the direction shown in FIG. 2 is progressively treated by the successive electrode arrays 24, with a portion of the "clean" gas being extracted through each successive take-off aperture. The design of the successive electrode arrays may be varied to take advantage of the changing gas conditions with, for example, the characteristics of the electrodes or the clearance between the electrodes and the earthed wall 23 varying in the successive electrode arrays as the gas becomes cleaner.

As shown in FIG. 2, the earthed wall 23 may comprise portions which are parallel to, or equidistant from, the electrode arrays, as well as portions which are angled away from the electrode array so that the distance between the electrodes and the earth wall varies. In addition, the earthed wall 23 may be augmented by internal walls or vanes 28 which better trap dust particles urged radially outwardly by the ionic wind, and then direct the dust particles to a collection hopper 29 at the base of the housing 2.

Instead of locating the electrodes on a tube located coaxially with a cylindrical outer wall as shown in the embodiment of FIG. 1, the electrode array and outlet apertures may be located in a planar member opposed to an earthed planar surface and coupled thereto by insulating walls to form a duct or passage for the inlet gas.

Figure 3:
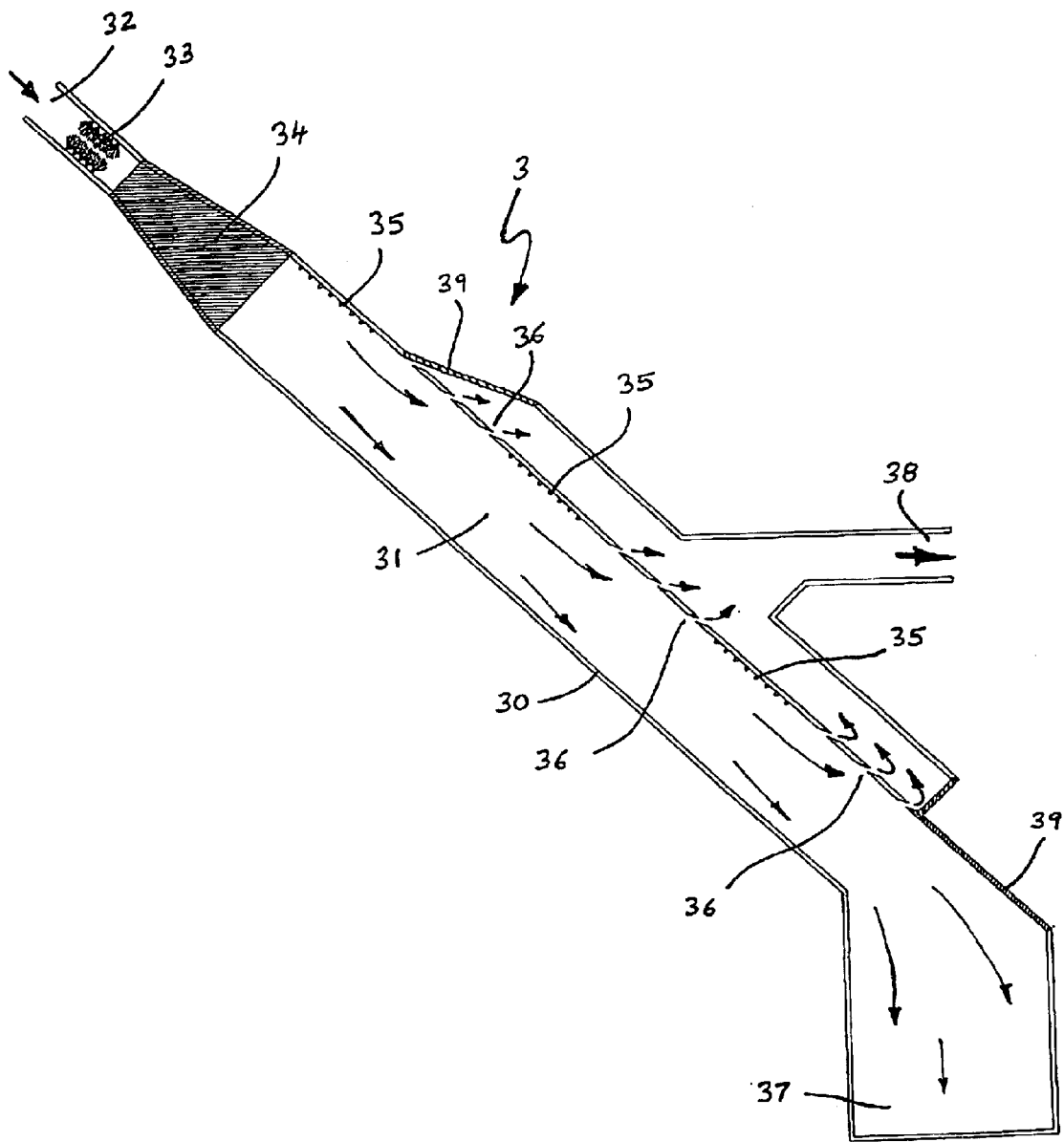
FIGS. 3 and 4 are sectional schematic views of further embodiments of the electrostatic filter of this invention.

FIG. 3 illustrates a third embodiment of the invention. The electrostatic filter 3 of FIG. 3 has a housing 30 defining a passage 31 for a gas stream. The passage communicates with an inlet 32 via the hollow interior of an insulating portion 34. A water spray 33 may suitably be provided at the inlet 32.

The electrostatic filter 3 also has a series of successive ion generators 35, with air take-off apertures 36 located after respective ion generators 35. Each ion generator 35 comprises a series of electrodes spaced in the direction of travel of the gas stream. The apertures 36 communicate with an outlet 38.

A hopper for collecting dust and other particles extracted from the air stream is provided at the bottom of the housing 30. High voltage components of the electrostatic filter are electrically insulated from other components of the filter by suitable insulative portions 39, 34.

In use, "dirty" gas entering inlet 32 is washed by the water sprays 33 before entering the chamber 31 via the plenum-like chamber formed in hollow insulating portion 34. As the gas stream passes an ion generator 35, the particles in the gas stream are charged by the ions travelling from the electrodes of the ion generator to the earthed wall opposite. The particles are thereby carried by the ionic "wind" to the opposite wall and "clean" gas is extracted through the outlets 36.

The components defining the outlets 36 are also charged to a high voltage. This high voltage generates intense electric fields around the apertures 36, repelling charged dust particles from the apertures.

The "clean" gas passes from the apertures 36 to the outlet 38 while particles "trapped" within the electrostatic filter travel down the inclined wall 30 and are collected in hopper 37.

The design of successive ion generators 35 and apertures 36 may be varied, to take into account that the gas becomes progressively "cleaner".

Figure 4:
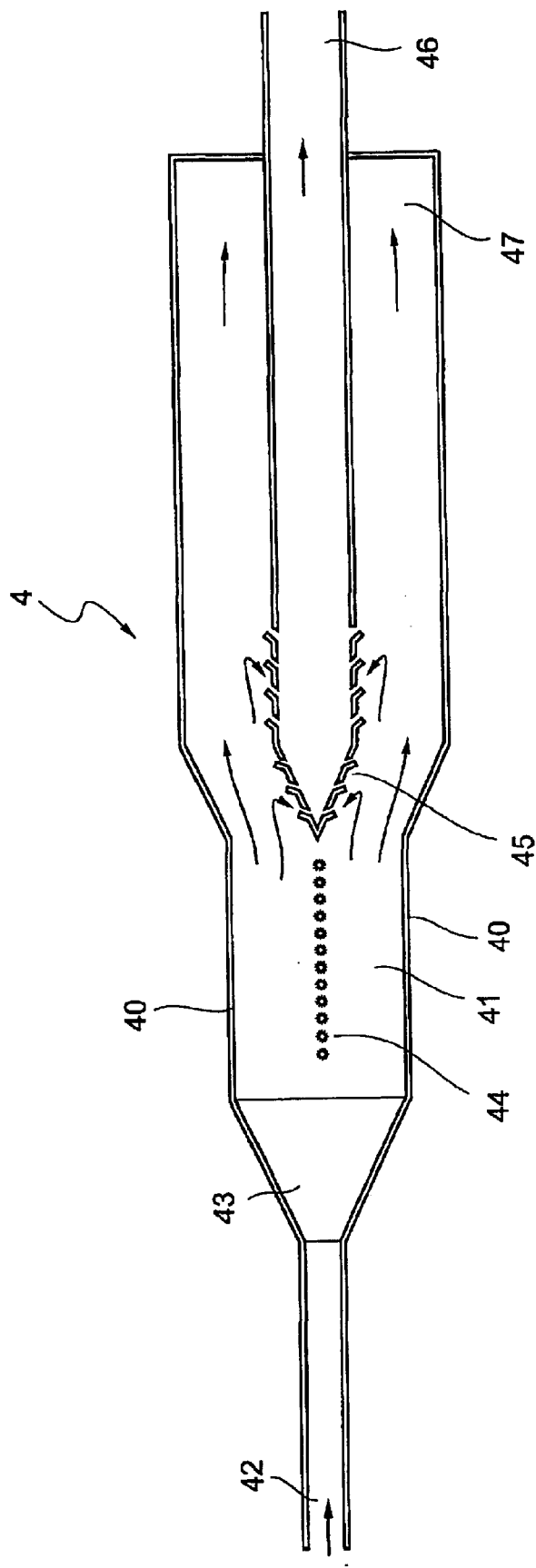

In an alternative embodiment, illustrated in FIG. 4, an electrostatic filter 4 comprises a square section housing 40 defining a chamber 41 therein. The chamber 41 receives "dirty" gas from an inlet 42, via a plenum section 43.

The chamber 41 has a series of axially-spaced electrodes 44. That is, the electrodes 44 are distributed along the direction of travel of the gas. The electrodes 44 generate ions which travel transversely to the gas flow to the opposite earthed walls of housing 40. The particles in the gas flow are charged by these ions, and are carried or urged towards the earthed walls of the housing 40.

Multiple apertures 45 are provided downstream of the ionising electrodes 44. These apertures may be suitably located behind vane-like formations, so that the particles in the gas stream must change direction in order to exit via the apertures. Clean gas is extracted via the apertures 45 and fed to an outlet 46. The particles extracted from the gas are collected in a hopper 47. As with the previous embodiments, the structure defining the apertures 45 may be charged to create electric fields across the apertures to repel charged particles.

The "clean" gas extracted from a single filter may still contain some contaminant particles. Multiple electrostatic filters may therefore be placed in series to treat the gas successively, with the "clean" gas extracted from one electrostatic filter being fed to the inlet of the next successive filter. The electrostatic filters in the series may have different internal arrangements to take advantage of the fact that the gas will be cleaner at each successive stage, and can therefore be designed to enhance fine particle removal. For example, in the first or early stage filter, the outlet apertures may be directed away from the inlet gas flow to create centrifugal forces, and the electrode array spaced further from the earthed surface to better collect larger dust particles, whereas in the second or later stage filters, the outlet apertures may be directed towards the inlet gas flow to obtain non-turbulent flow, and the spacing between the electrode array and the earthed surface decreased since the propensity of the electrodes to spark or arc will be reduced by the earlier removal of the large particles.

Alternatively, a "dirty" gas stream may be divided and fed to several electrostatic filters connected in parallel.

The foregoing describes only some embodiments of the invention, and modifications which are obvious to those skilled in the art may be made thereto without departing from the scope of the invention as defined in the following claims.

For example, the flow through the apertures can be adjusted by varying the size, location and/or orientation of the outlet apertures.

Further, or in the alternative, in the embodiment of FIG. 2, rotary valves may be placed in the apertures 25 to enable the gas flow through each aperture to be adjusted.

Although FIGS. 1 and 2 illustrate the electrode array and air take-off(s) being mounted on a tube located centrally within a generally cylindrical housing, the configuration may be reversed. That is, the electrodes and gas take-off(s) may be located on an outer wall, with the earthed surface being provided by an axial rod or tube located within the housing. In this embodiment, the gas flow distributor is suitably modified to direct the gas flow along the earthed rod or tube.

Depending on the particular application however, e.g. the type and size of the dust particles being treated, the distributor may be shaped and/or configured to distribute the gas flow in the vicinity of the electrode array.

Although the illustrated embodiments show housing walls of generally circular cross-sectional shape, other suitable shapes and configurations may be used, as would be evident to a person skilled in the art.

What is claimed is:

1. An apparatus for separating particles from a gas stream comprising
    a housing having a chamber therein, and an inlet for introducing the gas stream into the chamber,
    an ioniser in the housing for creating an ionising zone within the chamber through which the gas stream passes in use, particles in the gas stream being charged as they pass through the ionising zone, and
    a structure within the housing having an outlet for extracting gas from the chamber, the outlet comprising a plurality of narrow apertures in the structure, with the structure operatively charged to the same polarity as the charged particles such that an intense electric field extends across the apertures and charged particles approaching an aperture are repelled away from the aperture by the like-charged structure,
    wherein the outlet is located downstream from the ionising zone, and in that the particles are moved away from the outlet as they pass through the ionising zone.

2. The apparatus as claimed in claim 1, wherein the ioniser is an electrode array having multiple rows of electrodes distributed in the direction of travel of the gas stream, the electrodes being operatively connected to a high voltage power supply.

3. The apparatus as claimed in claim 1, wherein the apertures of the outlet are orientated so that the particles in the gas stream must substantially change direction in order to pass through the apertures.

4. The apparatus as claimed in claim 1, wherein the housing has a plenum-like space between the inlet and the chamber.

5. The apparatus as claimed in claim 1, having a series of said ionisers spaced in the direction of flow of the gas stream, each ioniser being followed by at least one of said apertures.

6. The apparatus as claimed in claim 1, wherein the apertures of said outlet are of adjustable size.

7. An installation for filtering a gas stream, the installation comprising a plurality of stages, each stage comprising the apparatus as claimed in claim 1.

8. A method of separating particles from a gas stream, including the steps of:

passing the gas stream through an ionising zone in which the particles are charged by a flow of ions from an ioniser for at least a minimum predetermined period, then passing the gas stream past at least one outlet in a structure which is operatively charged to the same polarity as the charged particles, with the outlet comprising a plurality of narrow apertures in the structure such that an intense electric field extends across the apertures and charged particles approaching an aperture are repelled away from the aperture by the like-charged structure, and extracting gas from the gas stream through the outlet, wherein the outlet is located downstream and separate from the ionising zone and in that the particles are moved away from the outlet as they pass through the ionising zone.

9. The method as claimed in claim 8, wherein the particles in the gas stream spend at least 0.2 seconds in the ionising zone, in use.

10. The method as claimed in claim 8, wherein the particles in the gas stream spend between 0.2 seconds and 2.0 seconds in the ionising zone, in use.

* * * * *